Jan. 8, 1924.  
T. SVOBODNY  
1,480,313
SHORT GRAIN HANDLING ATTACHMENT FOR BINDERS
Filed Jan. 18, 1923
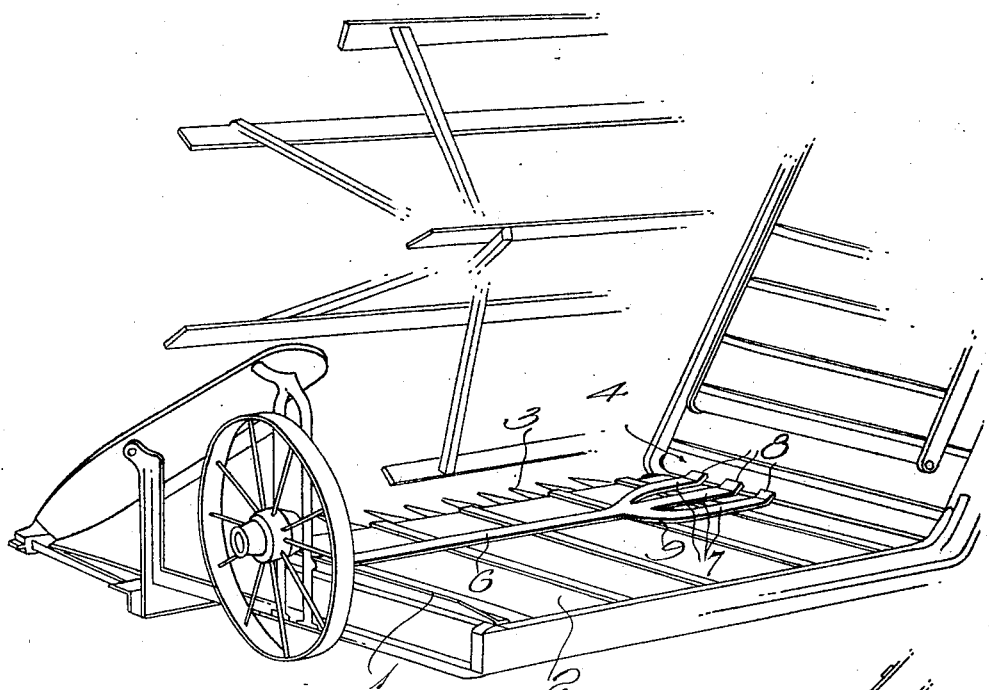
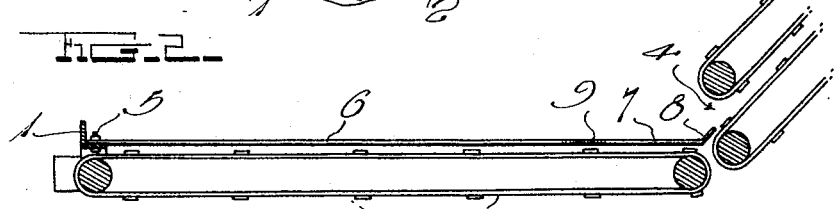
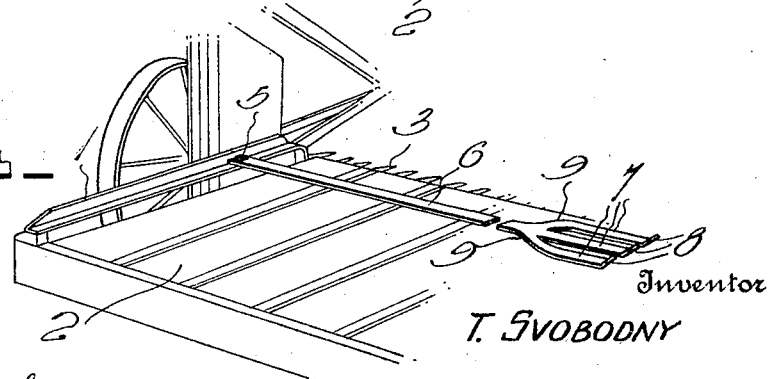
Inventor  
T. SVOBODNY Patented Jan. 8, 1924.

1,480,313

UNITED STATES PATENT OFFICE.

THOMAS SVOBODNY, OF SVEA, MINNESOTA.

SHORT-GRAIN-HANDLING ATTACHMENT FOR BINDERS.

Application filed January 18, 1923. Serial No. 613,470.

*To all whom it may concern:*

Be it known that I, THOMAS SVOBODNY, a citizen of the United States, residing at Svea, in the county of Kandiyohi and State of Minnesota, have invented certain new and useful Improvements in Short-Grain-Handling Attachments for Binders; and I do declare the following to be a full, clear, and exact description of the invention, such as will enable others skilled in the art to which it appertains to make and use the same.

My invention has for its object to provide an extremely simple and inexpensive, and an easily attached device for use in connection with grain binders for the purpose of bridging the gap between the usual horizontal platform apron and the inclined elevator, thus adapting the harvester for cutting flax and short grain.

With the foregoing in view, the invention resides in the novel subject matter hereinafter described and claimed, the description being supplemented by the accompanying drawing.

Figure 1 is a perspective view of a portion of a grain binder showing the application of my invention.

Figure 2 is a vertical sectional view showing more clearly the existing relation between the attachment and the machine.

Figure 3 is a perspective view looking in a different direction from Fig. 1.

In illustrating my invention, I have shown a conventional form of a grain binder which includes the usual platform frame 1, the horizontally movable platform apron 2, the reciprocating sickle bar 3 at the front edge of this apron, and the inclined endless elevator 4. I may utilize any desired part of the platform frame for attaching my invention and in the present showing, I have attached the device to one of the outer end bars of said frame by means of a bolt 5.

The attachment comprises a horizontal bar 6 which is preferably formed of metal, the outer end of this bar being adapted for securing to the platform frame, while the inner end thereof is provided with a plurality of spaced tines 7 which bridge the gap between the apron 2 and the elevator 4 and have their free ends inclined as indicated at 8 for guiding the grain onto said elevator. The bar 6 and its tines are preferably formed from a single piece of metal and the outer edges of the outermost tines converge to the edges of the bar as indicated at 9, for the purpose of preventing the grain from lodging.

The invention may be properly positioned according to the character of the crop being harvested and it will effectively serve to prevent short grain from dropping between the belt 2 and the elevator 4 and attention may be directed to the fact that the grain may engage with the apron slats through the spaces between the tines 7, so that the movement of the grain towards the elevator is in no manner retarded.

As excellent results may be obtained from the details disclosed, they may well be followed. I wish it understood however that the present disclosure is for illustrative purposes only and that numerous minor changes may be made in adapting the attachment for use with harvesters of different makes.

I claim:

1. The combination with a grain binder having the usual platform apron and elevator inclining therefrom; of a bar over the front portion of said apron and of negligible width with respect to the width of said apron, said bar extending from the outer end of the platform frame toward the elevator in rearwardly spaced relation with the front edge of said apron, the inner end of said bar having a plurality of horizontally spaced tines whose free ends turn upwardly to guide short grain onto said elevator.

2. The combination with a grain binder having the usual platform apron and elevator inclining therefrom; of a bar over the front portion of said apron extending from the outer end of the platform frame toward the elevator, the inner end of said bar having a plurality of tines whose free ends turn upwardly to guide short grain onto said elevator, the outer edges of the two outermost tines converging to the bar to prevent catching of the grain thereon.

3. A short grain handling attachment for grain binders comprising a bar adapted to extend over the front portion of a platform apron in rearwardly spaced relation with the front edge thereof, said bar being of negligible width with respect to the width of the apron and having one end adapted to be secured to the outer end of the platform frame, the other end of said bar having a plurality of horizontally spaced tines to bridge the gap between the apron and the usual elevator, the free ends of said tines being inclined to guide the grain onto the elevator.

4. A short grain handling attachment for grain binders comprising a bar adapted to extend over the front portion of a platform apron, one end of said bar being adapted to be secured to the outer end of the platform frame, the inner end of said bar having a plurality of tines to bridge the gap between the apron and the usual elevator, the free ends of said tines being inclined to guide the grain onto the elevator, the outer edges of the two outermost tines converging to the bar to prevent catching of the grain thereon.

In testimony whereof I have hereunto affixed my signature.

THOMAS SVOBODNY.